US012742526B2

(12) United States Patent
Suchanek, III

(10) Patent No.: US 12,742,526 B2
(45) Date of Patent: Sep. 22, 2026

(54) PORTABLE CHARGER FOR RECREATIONAL FLYING OBJECTS AND METHOD OF USE

(71) Applicant: Richard Donald Suchanek, III, Swansea, IL (US)

(72) Inventor: Richard Donald Suchanek, III, Swansea, IL (US)

( * ) Notice: Subject to any disclaimer, the term of this patent is extended or adjusted under 35 U.S.C. 154(b) by 0 days.

(21) Appl. No.: 19/285,873

(22) Filed: Jul. 30, 2025

(65) Prior Publication Data

US 2026/0036267 A1 Feb. 5, 2026

Related U.S. Application Data

(60) Provisional application No. 63/678,306, filed on Aug. 1, 2024.

(51) Int. Cl.

| | |
|---|---|
| ***F21L 4/02*** | (2006.01) |
| ***A63B 43/06*** | (2006.01) |
| ***A63B 65/10*** | (2006.01) |
| ***A63B 67/06*** | (2006.01) |
| ***F21V 9/30*** | (2018.01) |
| ***F21V 15/01*** | (2006.01) |
| ***F21W 131/40*** | (2006.01) |
| ***F21Y 115/10*** | (2016.01) |

(52) U.S. Cl.

CPC ................ *F21L 4/02* (2013.01); *A63B 43/06* (2013.01); *F21V 9/30* (2018.02); *F21V 15/01* (2013.01); *A63B 65/10* (2013.01); *A63B 67/06* (2013.01); *A63B 2225/76* (2020.08); *F21W 2131/40* (2013.01); *F21Y 2115/10* (2016.08)

(58) Field of Classification Search

CPC . F21L 4/02; A63B 43/06; A63B 65/10; A63B 67/06; A63B 2225/76; F21V 9/30; F21V 15/01; F21W 2131/40; F21Y 2115/10

See application file for complete search history.

(56) References Cited

U.S. PATENT DOCUMENTS

| | | | | |
|---|---|---|---|---|
| 4,927,015 A | | 5/1990 | Jones | |
| 5,311,413 A | | 5/1994 | Farmer et al. | |
| 6,161,738 A | * | 12/2000 | Norris | A45C 9/00 383/119 |
| 6,745,877 B1 | * | 6/2004 | Tsai | A45C 13/22 190/115 |

(Continued)

OTHER PUBLICATIONS

Redit: DIY Glow Bag is read for the season: https://www.reddit.com/r/discgolf/comments/qeik1f/diy_glow_bag_is_ready_for_the_season/?rdt=47974; accessed Jul. 28, 2025.

(Continued)

*Primary Examiner* — Tsion Tumebo

(74) *Attorney, Agent, or Firm* — Sandberg Phoenix & von Gontard, PC

(57) ABSTRACT

A portable charger for an illuminated recreational flying object, such as flying discs (e.g., Frisbees®), balls (i.e., golf balls, soccer balls, volley balls, etc.), badminton birdies, etc., is described. The portable charger permits a user to easily and rapidly charge the recreational flying object such as. The portable charger is scaled such that the illuminated flying disc is easily manually accessible from either side of the portable charger.

11 Claims, 8 Drawing Sheets

(56) References Cited

U.S. PATENT DOCUMENTS

| | | | | |
|---|---|---|---|---|
| 7,458,451 | B2 * | 12/2008 | Godshaw | A45C 13/04 190/107 |
| 7,870,851 | B2 | 1/2011 | Mahany | |
| 8,403,517 | B1 | 3/2013 | Cox et al. | |
| 11,253,751 | B2 | 2/2022 | Osborn et al. | |
| 2004/0031474 | A1 | 2/2004 | Ciesiun | |
| 2015/0069708 | A1 * | 3/2015 | Mashburn | A63B 67/06 273/400 |
| 2017/0130951 | A1 * | 5/2017 | Carrasco-Slind | F21V 33/0004 |
| 2017/0340080 | A1 | 11/2017 | DeLuz | |
| 2020/0352301 | A1 | 11/2020 | Blanchard et al. | |
| 2020/0400290 | A1 * | 12/2020 | Harris | F21V 23/0414 |
| 2024/0142091 | A1 * | 5/2024 | Lin | F21V 23/06 |

OTHER PUBLICATIONS

Redit: Glow Disk Charger; www.reddit.com/r/discgolf/comments/zodzc7/glow_disc_charger/; accessed Jul. 28, 2025.
HELIX disc golf disc charger: www.etsy.com/listing/1404990140/helix-disc-golf-disc-charger-glow-your; accessed Jul. 28, 2025.
Redit: I built a rechargeable glow-disc-box!; www.reddit.com/r/discgolf/comments/r0izbb/i_built_a_rechargeable_glowdiscbox/; accessed Jul. 28, 2025.
Etsy: Disc Golf Glow Box Bag Insert, Personalized; www.etsy.com/listing/1565612682/disc-golf-glow-box-bag-insert; accessed Jul. 28, 2025.
Golf—GLowV1 Glow Ball Charger Lighte Pack With Refills; www.amazon.com/Glow-Gear-Golf-Rechargeable-Accessories/dp/B08PMRCZFS?th=1&psc=1; accessed Jul. 28, 2025.
Modular Glow Fisc Oven; www.cults3d.com/en/3d-model/gadget/modular-glow-disc-oven; accessed Jul. 28, 2025.

* cited by examiner

PORTABLE CHARGER FOR RECREATIONAL FLYING OBJECTS AND METHOD OF USE

CROSS-REFERENCE TO RELATED APPLICATIONS

This application claims the benefit of U.S. Provisional Application No. 63/678,306 filed on Aug. 1, 2024, the contents of which (text, drawings and claims) are incorporated herein by reference.

FIELD

A device for rapid recharging of glow-in-the-dark recreational flying objects, such as flying discs (e.g., Frisbees®), balls (i.e., golf balls, soccer balls, volley balls, etc.), badminton birdies, etc., and which can be used in low light situations is disclosed. A method of use that exemplifies the advantages of the charging device is also disclosed.

BACKGROUND

Flying discs, such as sold, for example, by Wham-O Holding under the trademark "Frisbee®," feature in a variety of popular recreational activities, such as disc golf. In such activities, participants benefit from being able to easily visually track the location and trajectory of each flying disc. Dim lighting or darkness can make this visual tracking difficult. Nevertheless, enthusiasts have sought solutions to enjoy games like disc golf in, for example, dim foggy weather or at night. Hence, many flying disc enthusiasts make use of glow-in-the-dark flying discs that give off light and are thus more easily discerned in low light conditions.

However, flying discs also need to maintain core physical features that enhance their flight capacities, such as their aerodynamics and light weight. Some flying discs are manufactured to include small battery-powered light emitting diodes (LEDs), but these can upset the weight and form of the flying disc. Other flying discs are illuminated by chemical means, such as by being given a phosphorescent coating or by being cast from phosphorescent plastics. The use of phosphorescent materials can make so-called illuminated or glow-in-the-dark flying discs easier to visually track without significantly affecting the weight or aerodynamics of the flying disc. However, phosphorescent coatings and materials regularly need to be 'recharged' by exposure to light, or they will dim and eventually fail to luminesce. Many flying disc enthusiasts find that their illuminated flying discs fail to luminesce at inopportune moments, whether due to extended recreation time or just unplanned circumstances. Thus, it is not unusual, for example, for a disc golf player to bring many flying discs to a golf disc game, and to then switch flying discs as they lose their phosphorescence.

Thus, there is a need for a portable, simple solution for rapidly recharging illuminated flying discs and other recreational flying objects, such as balls (i.e., golf balls, soccer balls, volley balls, etc.), badminton birdies, etc. In particular, a recharging solution that can be easily packed along with one or more recreational flying objects is needed. In addition, as one primary purpose of any recreational or competitive activity is fun and enjoyment, there exists a need for a solution that contributes positively to the user experience.

SUMMARY

A portable charger is described herein that includes a body that defines a hollow space. The body includes an inner surface and an outer surface defining opposed first and second openings, a light source within the body, and first and second end members. Each end member includes a first hinged closure adjacent the first opening and a second hinged closure adjacent the second opening. Each of the first and second hinged closures is movable between a first position in which the associated opening is closed and a second position in which the associated opening is open.

In a preferred embodiment, each of the first and second hinged closures comprises a cap having an end surface and a sleeve. The sleeve is sized and shaped to fit around an end portion of the body. The end surface of each cap defines a hinged flap having a hinged edge. The end surface defines a slit surrounding the hinged flap.

Each hinged closure can further include an external sleeve, with each external sleeve including an end surface and a peripheral surface. The peripheral surface is sized and shaped to surround the cap. Each end surface includes a generally horizontal slit. The slit divides the end surface into first and second pivotal external flaps. The generally horizontal slit is offset from the slit of the cap such that the external sleeve substantially blocks light emitted from the light source from escaping the body through the slit of the cap.

The peripheral surfaces of the external sleeves can be sized such that in combination they substantially surround the outer surface of the body.

The light source can include a plurality of light-emitting diodes, and the light-emitting diodes can substantially cover the inner surface of the body.

Either or both of the first and second hinged closures can include an indicia illuminable by the light source. The indicia can be a product name and/or logo.

The cap and/or the external sleeve can be made of a flexible material. The body can include at least one anchor point protruding from the body which can receive a strap adapted to secure the portable charger to an external structure. In such an embodiment, the peripheral member of the external sleeve includes at least one hole positioned and sized to receive at least one anchor point, such that each anchor point extends through at least one the hinged closures.

BRIEF DESCRIPTION OF THE FIGURES

Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

Corresponding reference numerals indicate corresponding parts throughout the several views of drawings.

DETAILED DESCRIPTION

Figure 1:
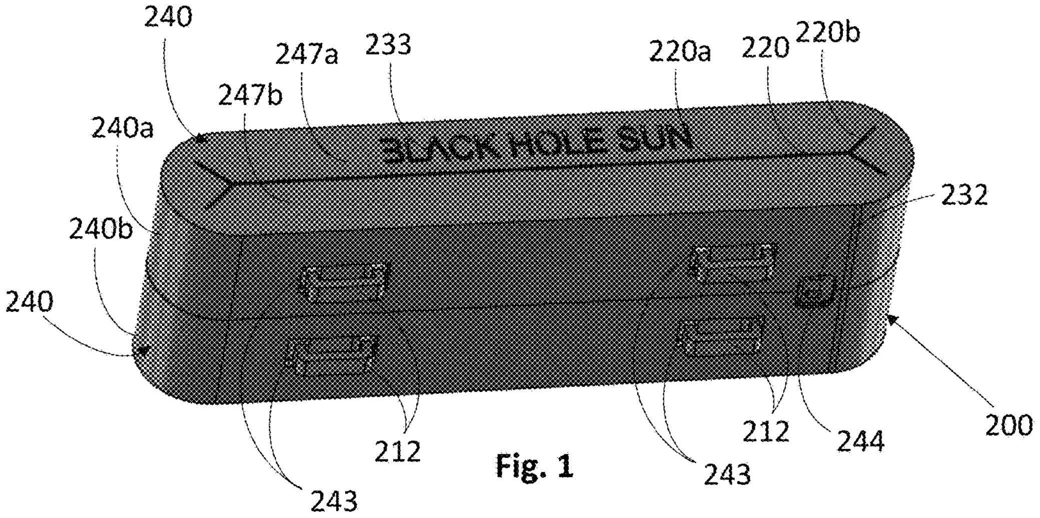
FIG. 1 is a perspective view of a portable charger.

The following description is merely exemplary in nature and is not intended to limit the claimed invention. Throughout this description, like reference numerals will be used to refer to like elements. Additionally, the embodiments disclosed below are not intended to be exhaustive or to limit the claimed invention to the precise forms disclosed. Rather, the embodiments are chosen and described so that others skilled in the art can utilize their teachings. As well, it should be understood that the drawings are intended to illustrate and plainly disclose presently envisioned embodiments to one of skill in the art but are not intended to be manufacturing level drawings or renditions of final products and may include simplified conceptual views to facilitate understanding or explanation. As well, the relative size and arrangement of the components may differ from that shown and still operate within the spirit of the disclosed device.

Figure 2A:
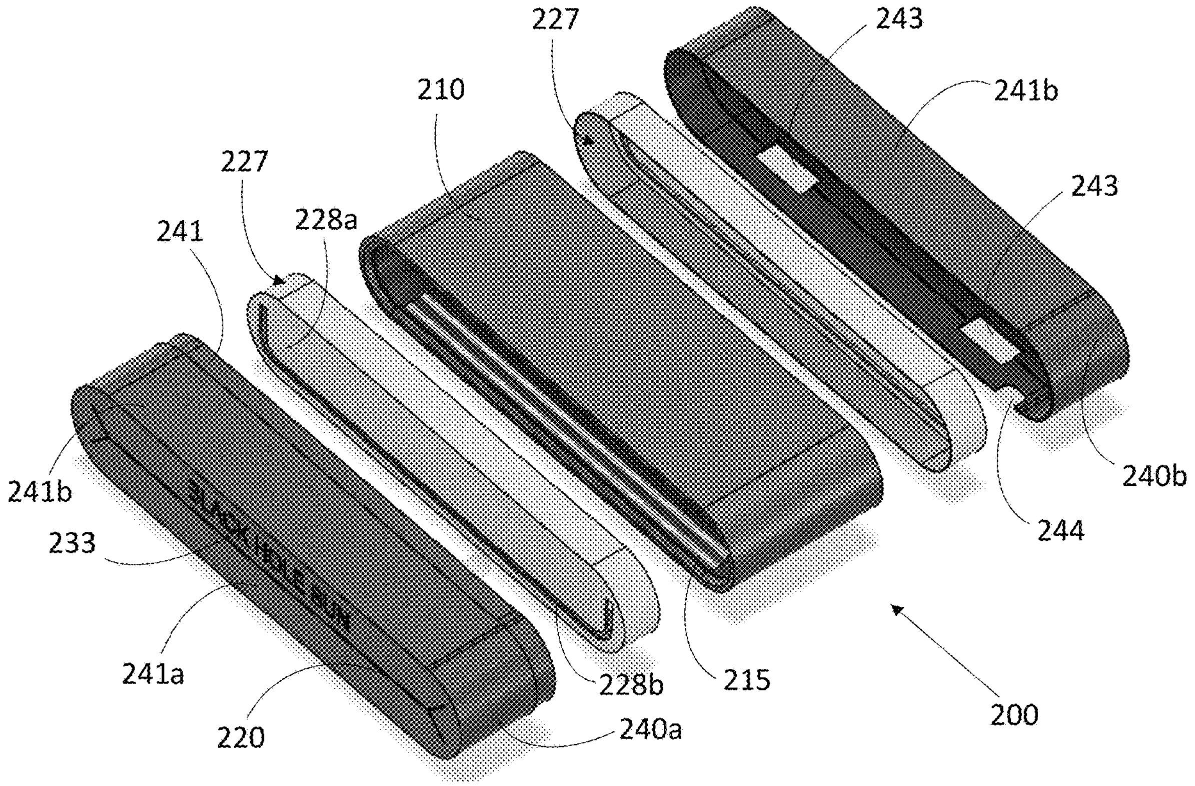
FIG. 2A is an exploded perspective view of the portable charger showing a body, two caps, and two external sleeves.
Figure 2B:
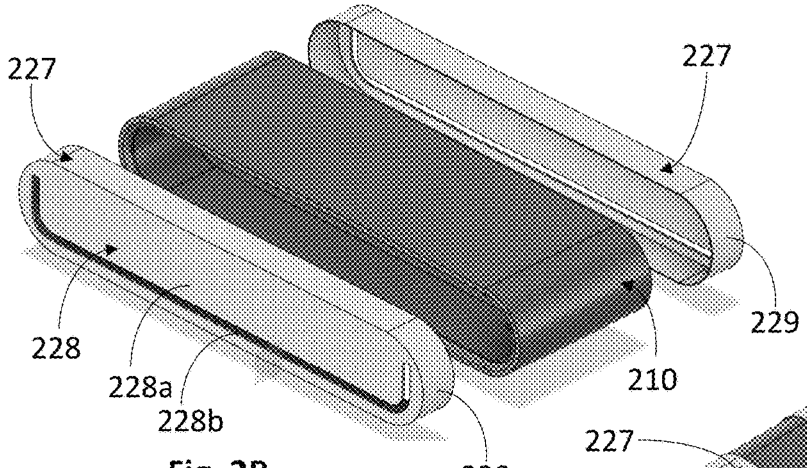
FIG. 2B is an exploded perspective view of the portable charger showing the body with the two caps.
Figure 2C:
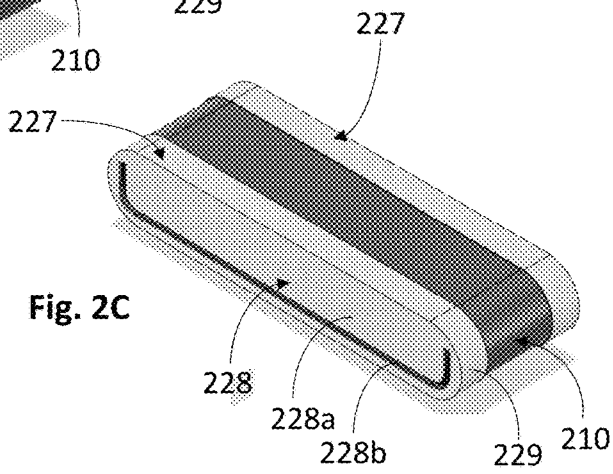
FIG. 2C is a perspective view of the body and two caps of FIG. 2B assembled together.
Figure 2E:
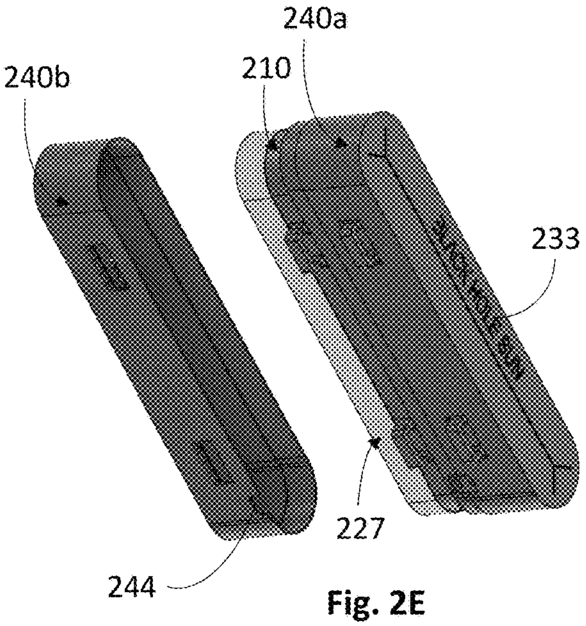
FIG. 2E is a partially exploded bottom perspective view of the portable charger showing the body assembled with the two caps, with one external sleeve covering one cap and the second external sleeve in position to be applied over the second cap.
Figure 2D:
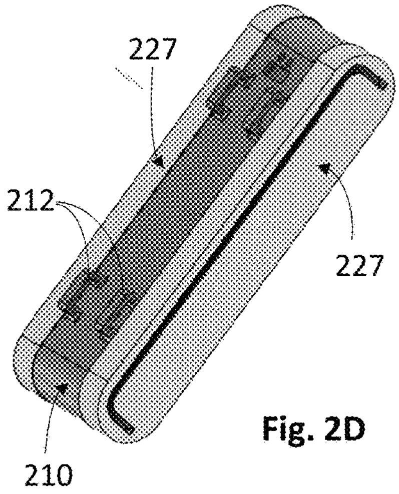
FIG. 2D is a bottom perspective view of the body and two caps of FIG. 2C, showing the relative positions of the two caps and anchor points of the body.
Figure 2F:
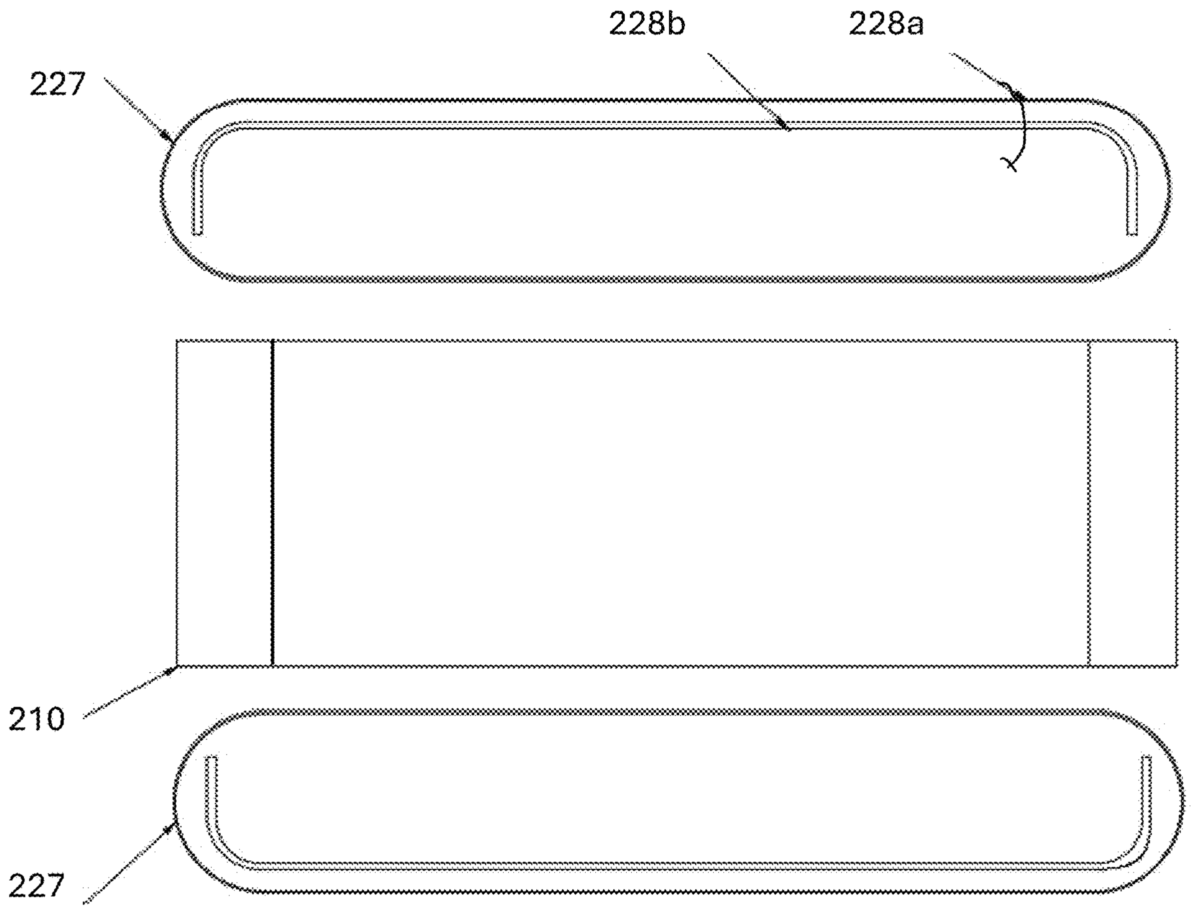
FIG. 2F is a view of the portable charger disassembled without the external sleeves and showing the body and the two caps.
Figure 3:
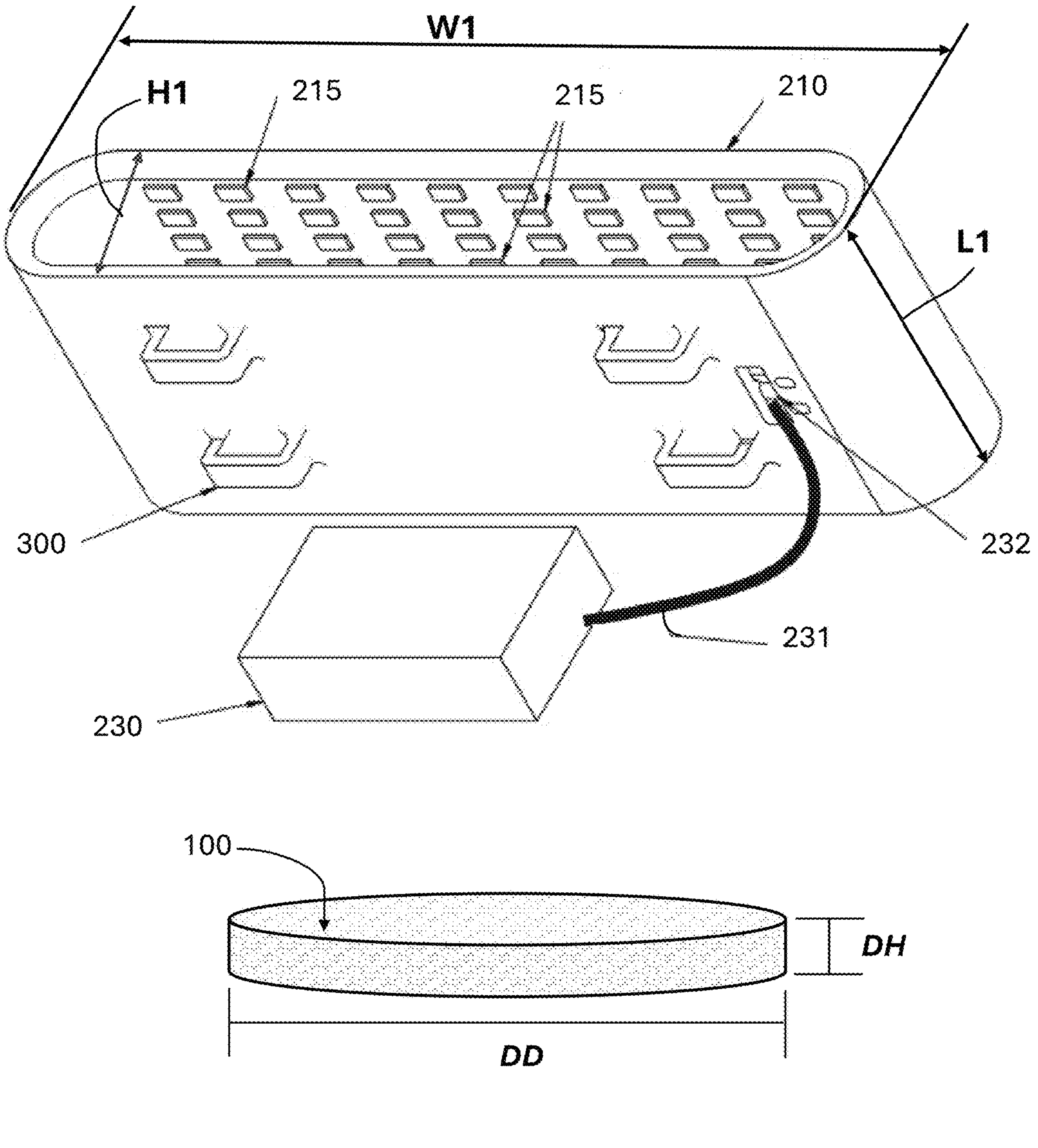
FIG. 3 is a perspective view of the body of the portable charger with an interior surface of the body being visible, showing a light source within the body and an external energy source for the portable charger, with an exemplary illuminated flying disc shown positioned in front of the portable charger.

A portable charger 200 is shown generally in FIGS. 1-3 for recharging an illuminated or "glow-in-the-dark" flying disc 100, so that the flying disc can again luminesce. The flying disc 100 has a height DH and a diameter DD. Although the illuminated flying disc 100 is exemplarily illustrated as a discus, it will be recognized that the illuminated flying disc 100 can assume any variety of shapes and contours known to one of ordinary skill in the art. Although the portable charger 200 is described for use with a flying disc, it will be apparent that, with changes to dimensions, the portable charge can be used to recharge other recreational flying objects that can benefit from luminescence, such as an illuminated golf ball, tennis ball, volley ball, soccer ball, badminton birdie, etc. The typical illuminated flying disc 100 comprises a luminescence source which can, for example, be a phosphorescent coating or chemiluminescent fluid which is applied to the flying disc or which is incorporated in the resin from which the flying disc is formed. If formed as a coating, the luminescent coating can cover the entire surface of the flying disc 100, or be applied to the flying disc 100 to form a pattern. Depending on the state of use of the illuminated flying disc 100, the luminescence source may be charged, uncharged, or partially charged.

The portable charger 200 as shown in FIGS. 1-3 comprises a body 210, which, as shown, is in the shape of a partially flattened tube which is open at its front and back ends and which has an inner and outer surface. The body has a height H1, a width W1, and a length L1. The height H1 and width W1 are greater than the height DH and the diameter DD of the illuminated flying disc 100, respectively, so that, as described below, the flying disc can pass through the body 210. However, the length L1 need not be greater than the diameter DD of the flying disc, and is preferably smaller than the diameter DD of the flying disc. The body 210 is preferably at least semi-rigid so that it will maintain its form and shape.

Figure 6:
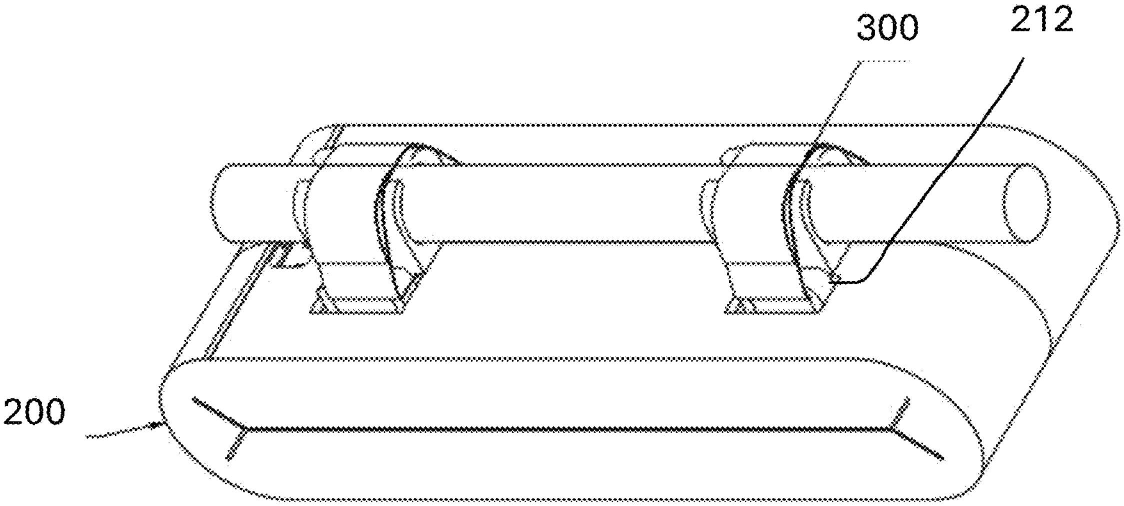
FIG. 6 is a perspective view of the portable charger mounted to a bar by means of an anchor point and straps.

The body 210 can also include one or more anchor points 212 extending from the outer surface of the body. Preferably, the body includes four such anchor points 212 formed as two pairs of passthroughs. As seen in FIG. 6, straps 300, such as Velcro straps, can be passed through the anchor points 212 to attach the portable charger to, for example, a cylindrical post for ease of portability. Various alternative designs to the one or more anchor points 212 can be contemplated, such as magnets, screws, and/or clips. The anchor points 212 and straps 300 can also be designed to attach to other stationary objects, such as backpacks, that further enhance the ease of portability of the portable charger 200.

The inner surface of the body 210 is provided with a light source 215. The light source 215 is sized and disposed to as to not obstruct the passage of the illuminated flying disc 100 through the portable charger 200. Preferably, the light source 215 comprises one or more strips 215*a* of light-emitting diodes (LEDs), such that the inner surface of the body 210 is essentially covered with LEDs. Preferably, the LEDs are ultraviolet (UV) LEDs. The light source 215 preferably emits light of sufficient intensity to charge the illuminated flying disc 100, preferably, in a few seconds or less. Alternatively, the interior surface of the body 210 can be reflective so as to minimize a loss of light intensity from absorption of light by the material of the body 210. By making the interior surface of the body 210 reflective, the source 215 can comprise fewer and/or less intense LEDs while still rapidly charging the illuminated flying disc 100.

An energy source 230 is in electrical communication with the light source 215 to power the light source. The energy source 230 as depicted for example in FIG. 3 comprises an external battery that is connected to the strips of LEDs 215*a* by cables 231 that pass through a port 232 in the portable charger body 210. However, the size and positioning of the portable energy source can vary according to the knowledge of one of ordinary skill in the art. For example, the energy source 230 can comprise a rechargeable battery system which is built into the body 210 of the portable charger 200. Alternatively, the body 210 can include a battery well which removably receives replaceable batteries (such as AAA or AA batteries or button batteries). Various alternative versions of the energy source 230 can be contemplated. In these instances, the portable charger can be provided with a switch to activate and deactivate the light source.

Front and back caps 227 are mounted to the front and back ends of the body 210. The two caps 227 are sized and shaped complementarily to the front and back ends of the body 210 and are made of a material that is at least flexible enough to enable the caps to snugly fit over and receive the ends of the body 210. Each cap 227 comprises an end surface 228 and a sleeve 229 which extends from the end surface. A generally U-shaped slit **228*b* is formed in the end surface of each cap to define a flap 228*a* which can pivot inwardly and outwardly relative to a top or bottom surface of the body 210. As seen, the U-shaped slit 228*b* defines three edges of the flap 228*a*. the forth edge defines a hinged edge of the flap, and it is this edge about which the flap can pivot. As can be appreciated, the flap 228*a* defines a closure formed in the cap. The slit 228*b* is sized so that the flap 228*a* is at least slightly wider and taller than the diameter DD and the height HD, respectively, of the illuminated flying disc 100 so that that the flying disc can pass through the slot. The two flaps 228*a* can pivot about their hinge edges to permit passage of the illuminated flying disc 100 into and out of the body 210. The two caps 227 substantially block light emitted by the light source 215 from escaping the body 210**.

The body 210 and the two caps 227 are enveloped by a cover 240 comprised of first and second external portions **240*a,b* as shown in FIGS. 1, 2A and 2E. Each portion comprises an end surface 241*a* and a sleeve 241*b* extending from the end surface sized to fit about the cap 227. The first sleeve 240*a* comprises a circumferential lip 241 which is covered by the second sleeve 240*b*, such that, when the first and second sleeves 240*a,b* are in place, the first and second sleeves 240*a,b* are flush with one another, such that the cover 240 substantially fully envelopes the body 210 and the two caps 227**.

The first and second sleeves **240*a,b* each can comprise one or more attachment holes 243 which are sized and positioned to align with the anchor points 212 of the body 210. The anchor points 212 extend through the holes 243 and beyond the cover 240 to enable the strap 300 to pass through the anchor points 212. As can be appreciated, the anchor points 212 will help prevent axial movement of the sleeves 240*a,b* relative to each other. The attachment holes 243 are shown to be generally rectangular, but could be of any desired shape so long as they accommodate the anchor points 212**.

The first and second sleeves **240*a,b* each can also comprise a port notch 244. The port notch 244 is illustratively shown as a rectangular notch which is cut into the first sleeve 240*a* and/or second sleeve 240*b*, as necessary. The port notch is sized and shaped to align with the port 232 of the body 210. The port 232 thereby remains accessible to the cables 231 even when the cover 240 envelopes the body 210**.

Each sleeve **240*a,b* comprises a slit 220 which extends generally across the end surface 241*a*. The slits 220 each comprise a horizontal slit 220*a* which extends substantially the side-to-side width of the sleeves and two angled slits 220*b* extending from each end of the horizontal slit such that the ends of the slits 220 are generally Y-shaped. As can be appreciated, the slit 220 effectively defines upper and lower flaps 247*a,b* separated by the horizontal slit 220*a* on each the end surfaces 241*a* of each sleeve 240*a,b*. The slit 220 is formed such that flaps 227*a,b* will overlap the flaps 228*a* of the caps 227 such that the slit 220 of the cover 220 will be substantially closed by the flap 228*a* of the cap 227 to further prevent light from escaping from the body 210. As such, the flaps 228 of the caps 227 can be deemed inner flaps and the flaps 247*a,b* of the cover sleeves 240*a,b* can be deemed outer flaps. The slit 220*s* of the cover 240 are sized such that the angled slits 220*b* are complementary in size and position to a contour of the illuminated flying disc 100. Each of the two slits 220 is positioned so as not to substantially overlap either of the cap slits 228*b*, such that the cap slits 228*b* will be substantially fully covered by the flaps 247*a,b* of the external sleeves 240*a,b*. Both of the slits 220 are sized to permit passage of the illuminated flying disc 100 from outside of the portable charger 200, through the body 210, and then back outside of the portable charger 200**.

Each of the first and second sleeves **240*a,b* can also comprise indicia 233, such as product names and/or logos, on one or both end surfaces 241*a*. The product names and/or logos 233 comprise a plurality of letters, symbols, and/or designs and can be etched to a depth such that the cover 240 is effectively translucent in the area of the indicia 233, so that the light from the light source 215 illuminates the indicia. Alternatively, the indicia 233 can be punched through the exterior end surfaces 241*a* of the cover 240 entirely, such that the indicia 233 define holes in the cover 240. As shown, the indicia 233 is positioned just above horizontal slit 220*a* of the slit 220 to preferably be centered across one of the outer flaps 247*a,b*. Alternatively, the indicia can be positioned just below either of the two slits 220. Other variations can be recognized by one of ordinary skill in the art, such as the use of only one product name and/or logo 233 positioned on either sleeve 240*a,b***.

The two caps 277, the cover 240 (comprised of the sleeves **240*a,b*) can be made from cloth, plastic, thin rubber, or any other soft flexible material, and can be of any design known to one of ordinary skill in the art. Alternatively, the sleeve 240 can be made of a rigid material and the outer flaps 227*a,b* can be hinged to provide passage to the body 210. In various exemplary embodiments, the sleeves 240*a,b* can be of a mix of materials; for example, the end surface 241*a* can be made from a soft flexible material while the rest of the sleeves 240*a,b* can be made from a rigid material. The sleeves 240*a,b* can be useful in substantially blocking light from the light source 215 from exiting the body 210 and can also protect the body 210 from ambient dust, dirt, and other debris that might otherwise freely enter through either of the two slits 220**.

Except for the two slits 220, the one or more attachment holes 243, the one or more port inserts 244, and the indicia 233, the sleeve 240 is opaque and substantially fully envelopes the body 210, so that substantially no light emitted by the interior light source 215 will escape the portable charger 200. The two slits 220 can be provided with any of a variety of additions such as brushes through which the flying disc passes which can substantially prevent light from the one or more light sources 215 from escaping the body 210 of the portable charger. This will reduce the potential for the light produced by the light sources 215 from interfering with the vision of those using the portable charger at dusk or in the dark.

Although the second sleeve **240*b* is described above as receiving the first sleeve 240*a* with the aid of the circumferential lip 241, one of ordinary skill in the art can contemplate other means of mutually securing the first and second sleeves 240*a,b*. For example, the first sleeve 240*a* may include multiple protrusions sized and disposed to be received by complementary holes in the second sleeve 240*b*. Alternatively, the first sleeve 240*a* and the second sleeve 240*b* may be substantially symmetric. In such an embodiment, the first and second sleeves 240*a,b* may affix either to each other or to the body 210 by any means known to one of ordinary skill, including by snap attachments or hook and loop attachment points. Any arrangement of the first and second sleeves 240***a,b* that still enables the cover 240 to substantially block light from escaping the portable charger 200 while permitting the passage of an illuminated flying disc 100 is contemplated to be within the scope of the portable charger 200 as described. In an alternative the two external sleeves 240*a,b* could be shaped so that their ends simply abut each other. In this instance, the portion 241*b* of each sleeve 240*a,b* surrounding the body can be sufficiently flexible so that it will snugly fit around the body to be held in place substantially by friction and the anchor points 212 passing through the holes 243. Alternatively, the portion 241*b* of each sleeve surrounding the body could be held in place by any other desired means, such as adhesive, a rib and groove interference fit, etc. The portions 241*b* of the sleeves could even be bonded to the body 210.

Figure 4A:
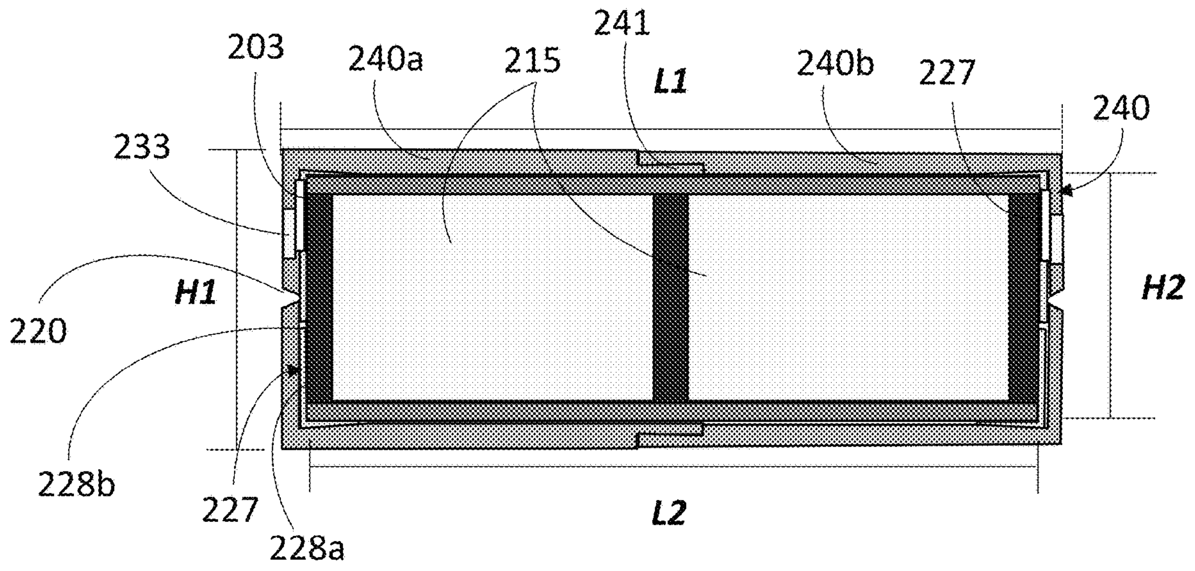
FIG. 4A is a schematic cross-sectional view of the portable charger, showing the arrangement of the cap and external sleeve when positioned on the body of the portable charger.
Figure 4B:
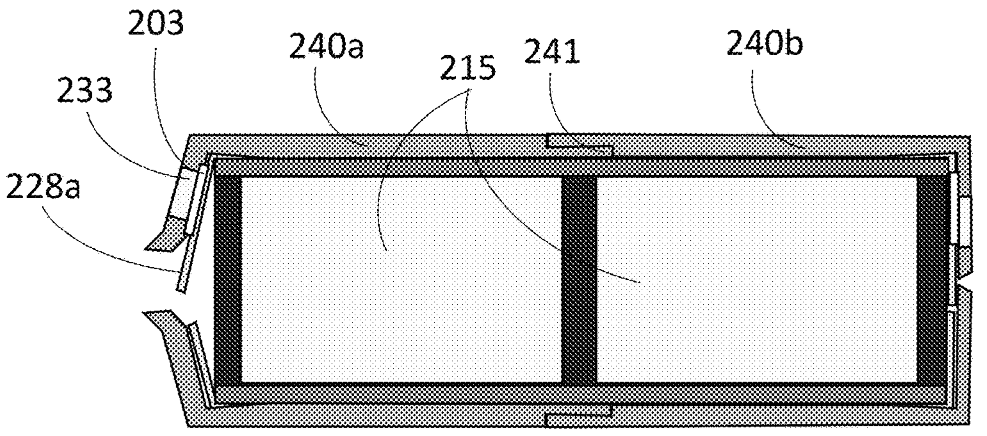
FIG. 4B is a schematic cross-sectional view of the portable charger similar to FIG. 4A, showing the position of internal and external flaps of the cap and external sleeve of an exit end of the portable charger when a flying disc is passed through a cap and external sleeve.

Referring to FIGS. 4A and 4B, the portable charger can further comprise one or more strips of luminescent material 203 each affixed to the interior surface of the external sleeves 240*a,b* directly behind the indicia 233. The luminescent material 203 is a material, such as a glow tape which, upon being exposed to light (including UV light) will glow. Prior to any movement of either of the flaps 228*a* and as shown in FIG. 4A, the strips of luminescent material 203 are each effectively sandwiched between the outer sleeve 240*a,b* and the flaps 228*a* of the caps 227, and each strip of luminescent material is thereby blocked from exposure to light emitted by the light source 215. Thus, when the flaps of the inner and outer sleeves are in a closed position, the indicia 233 will be dark.

However, as shown in FIG. 4B, due to the fact that the inner flap 228*a* is longer than the outer flaps 248*a,b*, when one of the outer flaps 248*a,b* is opened (i.e., pivoted inwardly or outwardly relative to the body 210), such as by the passing of the illuminated flying disc 100 through the portable charger 200, a gap is formed between the inner and outer flaps. This gap is sufficient in size such that light from the light source can reach the strip of luminescent material 203 while the flying disc is being passed through the portable charger, causing the luminescent material to glow. The glow of the one or more strips of luminescent material 203 can be seen from outside the portable charger 200 through the indicia 233, providing the impression that the indicia 233 glows. After the flying disc exits the portable charger, the inner lip will prevent the light from reaching the luminescent strip, and the indicia will cease to glow or will glow for only so long as the glow strip remains energized from its exposure to the light source. If desired, a window could be formed in the inner flap, which would provide for a longer exposure of the luminescent material to the light from the light source, and thus, the logo could then glow even when flying disc is not being passed through the portable charger.

Figure 7A:
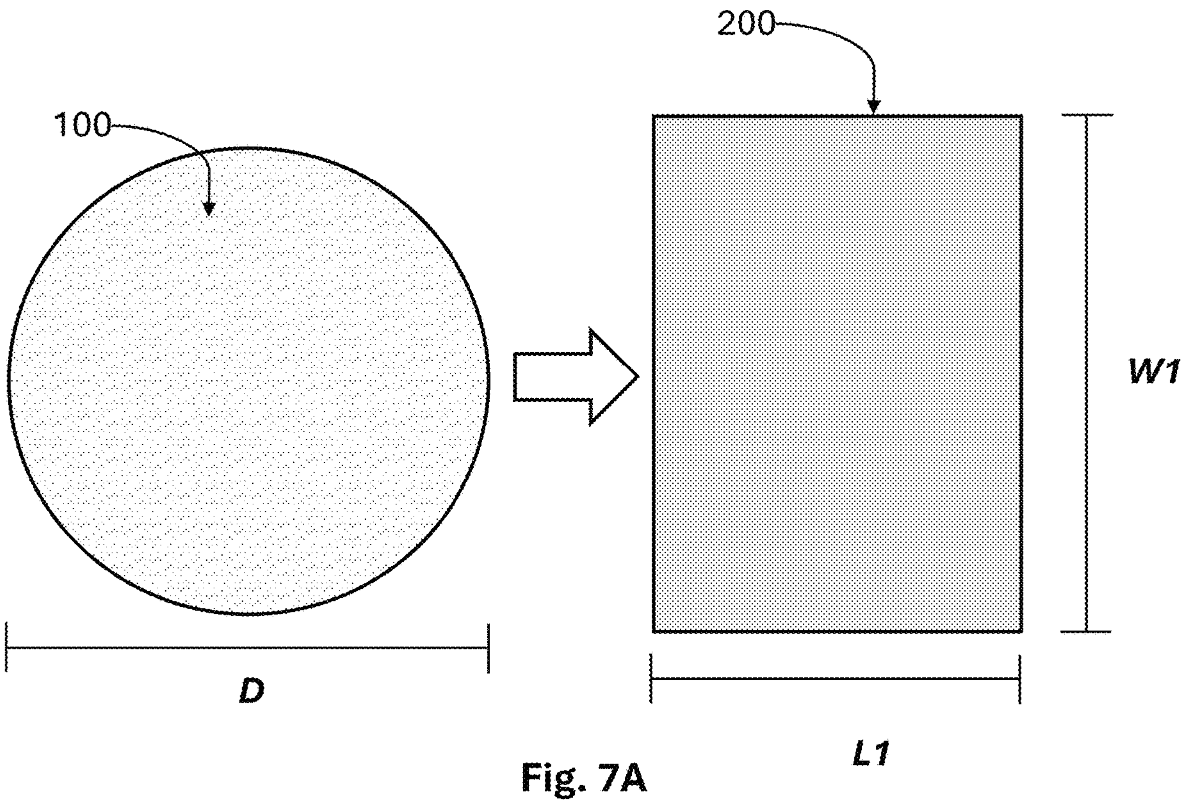
FIG. 7A is a schematic top elevational view of the portable charger and an illuminated flying disc, showing a method of use.
Figure 7B:
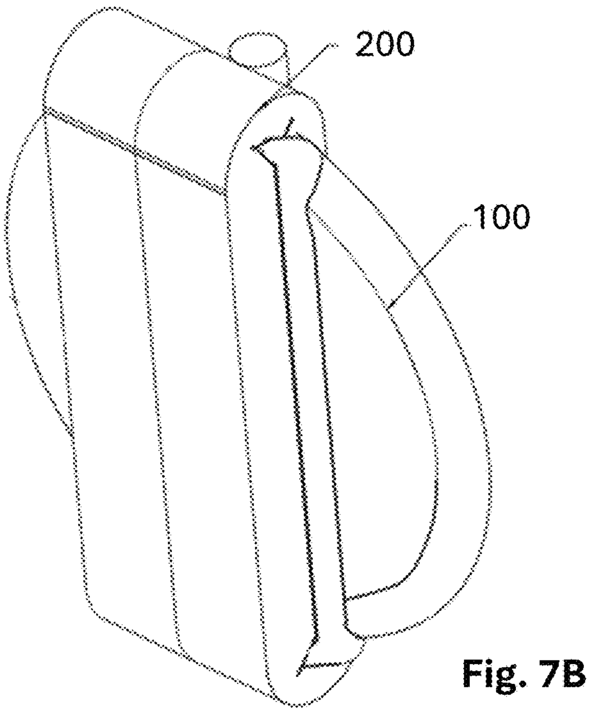
FIG. 7B is a photograph of the body of the portable charger attached to a bar attachment point with an exemplary illuminated flying disc passing partly through the body.

Referring now to FIGS. 7A and 7B, an exemplary method of use of the portable charger 200 is depicted. In this non-limiting example, the flying disc 100 is lined up with the portable charger 200. The flying disc 100 is inserted into the portable charger 200 by passing through the flaps 247*a,b* of the one of the outer sleeves 240*a,b* and through the flap 228 of the inner cap 227. As the flying disc 100 passes through the portable charger 200, the luminescence source of the flying disc is charged by exposure to light emitted by the light source 215 in the body 210. The flying disc is continued to be pushed through the body 210 to then pass through the inner and outer flaps 228, 247*a,b* of the opposite inner cap 227 and outer sleeve 241*a,b*. When the illuminated flying disc 100 emerges from the portable charger 200 through the other of the two apertures 220, its luminescence source (e.g., phosphorescent or chemiluminescent materials) will be recharged to continue to glow. Preferably, the light source has an intensity or wavelength so that the illuminated disc can be recharged quickly (i.e., in a matter of seconds). Thus, in some versions, the luminescence source of the flying disc will be instantly "hypercharged" after passing through the portable charger and will be ready for immediate use after it exits the portable charger. As shown in FIG. 7B, at any point during passage of the illuminated flying disc 100 passage through the portable charger 200, a portion of the illuminated disc is easily accessible to a user, because the diameter D of the illuminated flying disc 100 is larger than the length L1 of the portable charger. Thus, the illuminated disc 100 can continuously be held from one side or the other of the portable charger to push or pull the disc 100 through the portable charger.

Figure 5A:
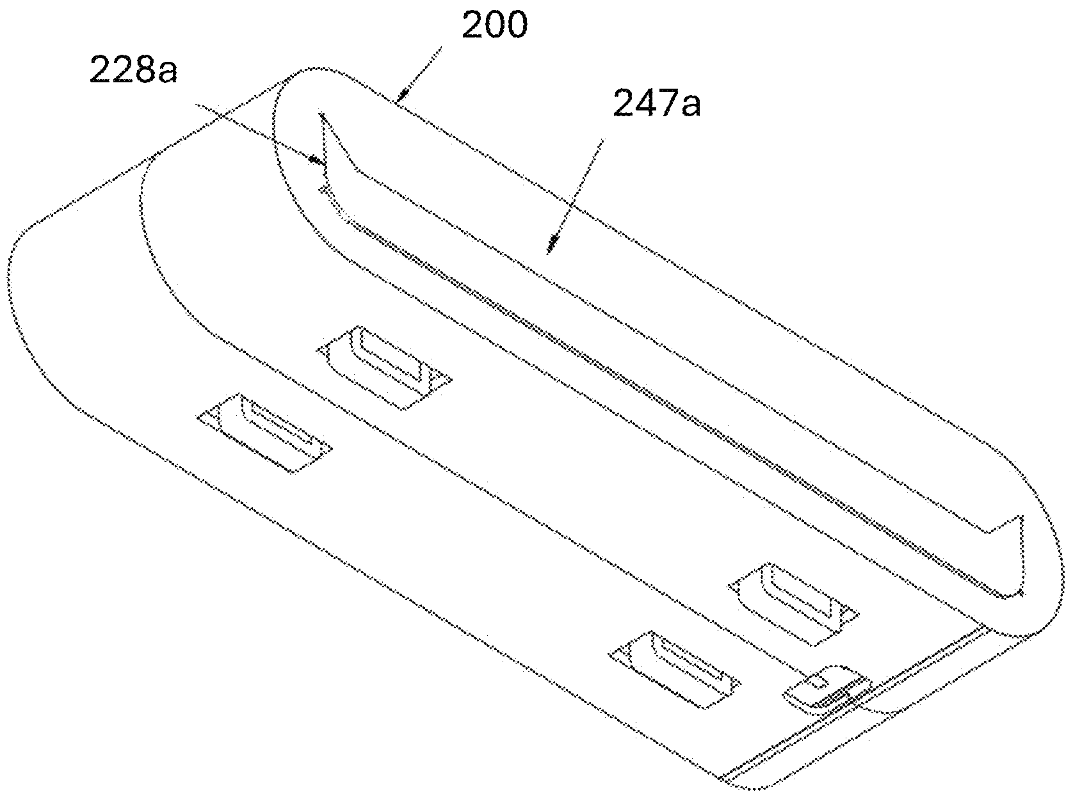
FIGS. 5A-B are perspective partial and end views of the portable charger showing a displaced interior flap which closes an opening into the portable charger.
Figure 5B:
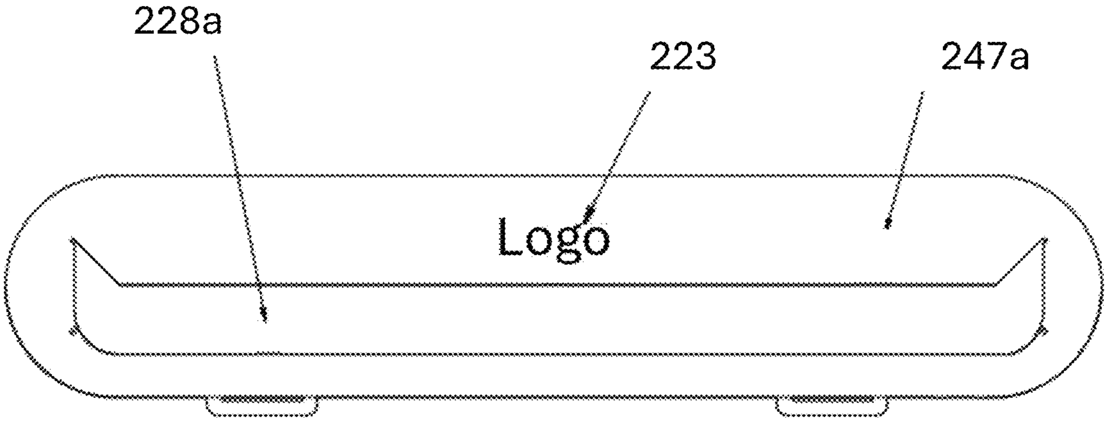
Figure 5C:
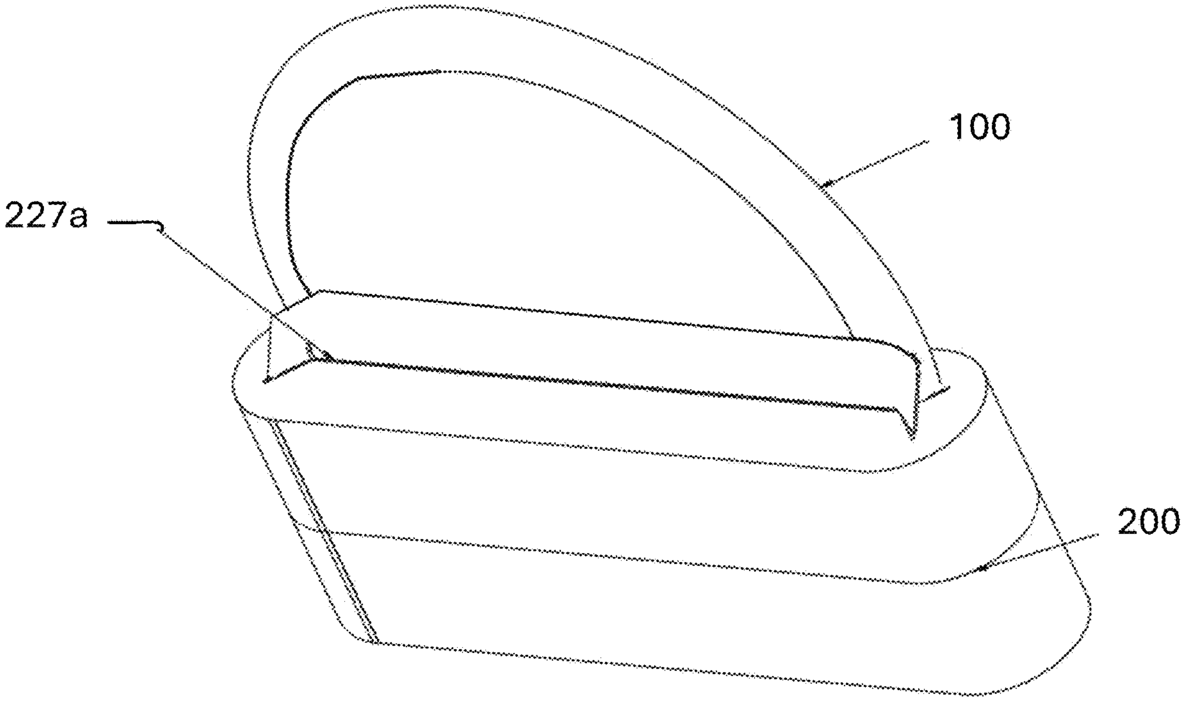
FIG. 5C is a perspective view of the portable charger showing a flying disc being passed through the portable charger

As can be appreciated, when the flying disc 100 is passed through the portable charger 200, the flying disc 100 will pivot the set of outer and inner flaps 228, 247*a,b* it passes through inwardly. Then, as the flying disc exits the portable charger, the flying disc will cause the inner and outer flaps to pivot outwardly. As seen in FIGS. 5A,B, the inner flap 228*a* is sized such that it has a side-to-side length no greater than the side-to-side length of the upper and lower outer flaps 247*a,b*. Thus, when the flying disc pivots the flaps outwardly, a lower portion of the inner flap 228*a* will extend through the slot 220 in the cover sleeve to overlay a lower portion of the lower outer flap 247*b*. This will further prevent light from escaping from portable charger. As seen in FIG. 5C, the inner flap 228*a* can be shaped so as to complement the contours of the illuminated flying disc 100.

The description herein is merely exemplary in nature and, thus, variations that do not depart from the essence of that which is described are intended to be within the scope of the teachings. It will be apparent that the body 210 could be formed in other shapes as well, including, for example, rectangular, so long as such shapes permit the passage of the illuminated flying disc 100. Further, the charger could be provided with a switch, sensor, or other physical or electronic means which activates the light source. Such a switch can be a manual switch (so that the user can activate the charger). Alternatively, the switch could be a pressure switch or other physical switch which is contacted by the inner flap when the flying disc is inserted into the charger. Thus, the act of passing the flying disc into the portable charger will automatically activate the light source. In this instance, the light source could be activated for a predetermined amount of time or the portable charger could be provided with a second switch on the opposite side of the charger which is engaged as the flying disc exits the portable charger, such that when the flying disc fully exits the portable charger, the light source will be deactivated. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. In an alternative, the portable charger could omit either the inner caps 227 or the outer sleeves 204*a,b*, such that the ends of the body are closed by a single member. Finally, as noted above, although the portable charger is described for use with flying discs (i.e., Frisbees®), by altering the dimensions (height, width, length) of the portable charger, the portable charge could be used to recharge the luminescence of other recreational flying objects, such as balls (i.e., golf balls, soccer balls, volley balls, tennis balls etc.), badminton birdies, etc. Such variations and alternative combinations of elements and/or functions are not to be regarded as a departure from the spirit and scope of the teachings.

What is claimed is:

1. A portable charger for a recreational flying object adapted to luminesce, said portable charger comprising:

a body comprising an inner surface and an outer surface defining a hollow space having opposed first and second openings;

a light source within the body;

a first end member comprising a first hinged closure adjacent said first opening and a second end member comprising a second hinged closure adjacent said second opening, each of said first and second hinged closures being movable between a first position in which the associated opening is closed and a second position in which the associated opening is open, wherein each of said first and second end members comprises a cap, each said cap comprising an end surface and a sleeve wherein the sleeve is sized and shaped to fit around an end portion of the body; the end surface defining a hinged flap, said hinged flap comprising a hinged edge about which said hinged flap can pivot, and said end surface defining a slit surrounding said hinged flap.

2. The portable charger of claim 1 wherein each end member further comprises an external sleeve which covers said cap, each external sleeve comprising an end surface and a peripheral surface extending from said end surface, the peripheral surface being sized and shaped to surround said cap; each end surface comprising a generally horizontal slit, said slit dividing the end surface into first and second pivotal external flaps, said generally horizontal slit being offset from said slit of said cap, whereby the external sleeve substantially blocks light emitted from the light source from escaping the body.

3. The portable charger of claim 1 wherein the cap is made of a flexible material.

4. The portable charger of claim 2 wherein the external sleeves are made of a flexible material.

5. The portable charger of claim 2 wherein the peripheral surfaces of the external sleeves are sized such that in combination they substantially surround the outer surface of the body.

6. The portable charger of claim 1 wherein the light source comprises a plurality of light-emitting diodes.

7. The portable charger of claim 6 wherein the light-emitting diodes substantially cover the inner surface of the body.

8. The portable charger of claim 1 wherein either or both of the first and second hinged closures comprise an indicia illuminable by the light source.

9. The portable charger of claim 8 wherein the indicia is a product name and/or logo.

10. The portable charger of claim 1 comprising at least one anchor point adapted to receive a strap; said strap being adapted to secure the portable charger to an external structure.

11. The portable charger of claim 10 wherein the at least one anchor point protrudes from the body; the end closure comprising a peripheral member surrounding said body; said peripheral member comprising at least one hole positioned and sized to receive the at least one anchor point, whereby the at least one anchor point extends through at least one the hinged closures.

* * * * *